United States Patent

Plantan

[15] 3,649,047
[45] Mar. 14, 1972

[54] ELEVATABLE FIFTH WHEEL

[72] Inventor: Ronald S. Plantan, Wickliffe, Ohio

[73] Assignee: White Motor Corporation, Cleveland, Ohio

[22] Filed: July 24, 1970

[21] Appl. No.: 57,994

[52] U.S. Cl. .................................. 280/425 R, 280/423 R
[51] Int. Cl. ............................................. B62d 53/08
[58] Field of Search ............................................. 280/425 R

[56] References Cited

UNITED STATES PATENTS 2,953,410  9/1960  Chaney .......................... 280/425 R X
3,139,289  6/1964  Richter .............................. 280/425 R

FOREIGN PATENTS OR APPLICATIONS 1,235,509  5/1960  France .............................. 280/425 R

*Primary Examiner*—Leo Friaglia
*Attorney*—Watts, Hoffmann, Fisher & Heinke

[57] ABSTRACT

A tractor-trailer fifth wheel is vertically elevatable on a direct acting mechanical movement comprising two links pivotally connected together adjacent their inner ends. The two links also pivot about their outer ends which are longitudinally spaced in the tractor frame. The outer end of one link is linearly movable relative to the outer end of the other link which is stationary. The latter mentioned link rotates about its stationary end. The other link rotates about and moves longitudinally with its outer end, both links hinging upwardly at their inner ends in consequence of longitudinal movement of the one link. The fifth wheel is pivotally mounted on the inner end of the rotational and longitudinally movable link which inner end undergoes a compound nearly straight-line vertical movement owing to the combined movement of the two links.

14 Claims, 9 Drawing Figures

Patented March 14, 1972  3,649,047

INVENTOR.
RONALD S. PLANTAN
BY
Watts, Hoffmann, Fisher & Heinke
ATTORNEYS.

Patented March 14, 1972

INVENTOR.
RONALD S. PLANTAN
BY
Watts, Hoffmann, Fisher & Heinke
ATTORNEYS.

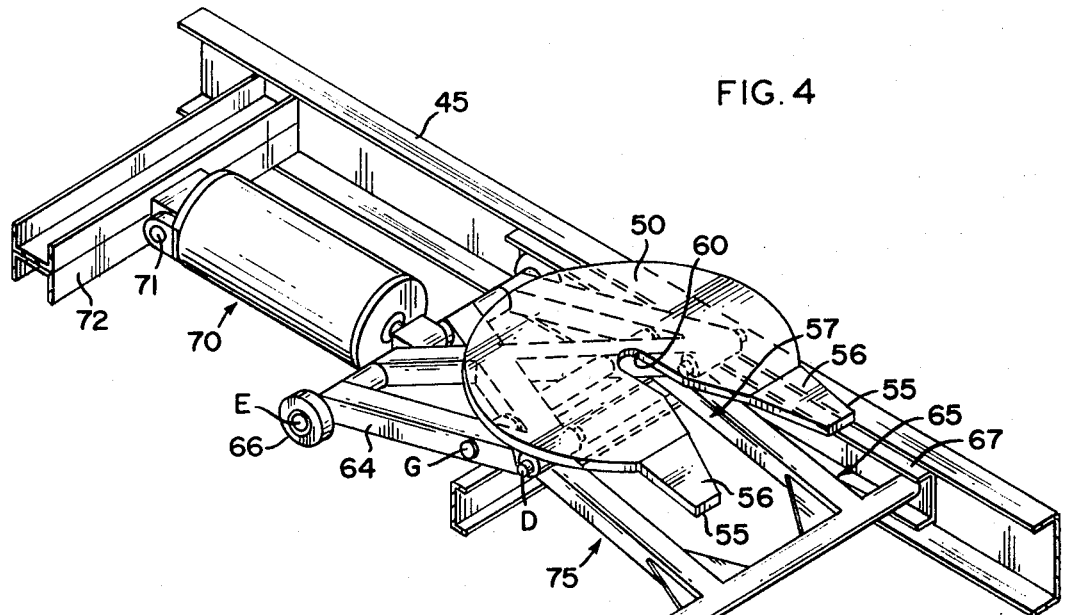
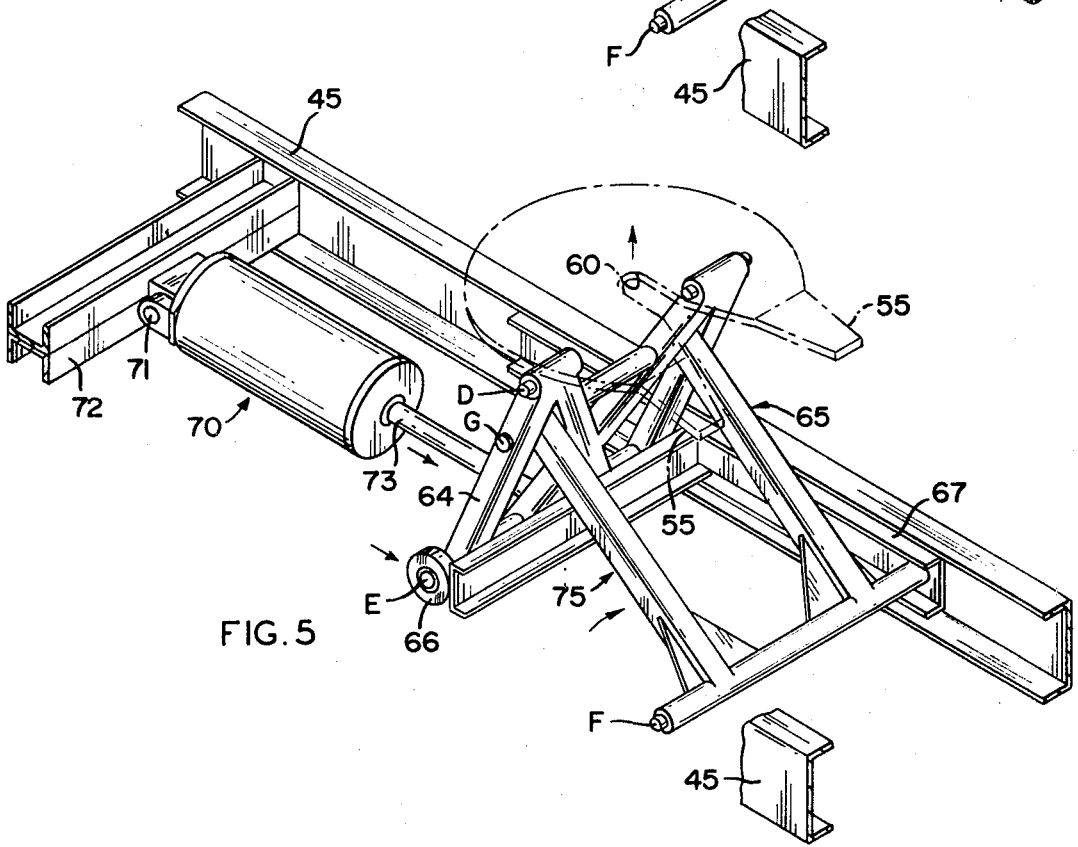

ELEVATABLE FIFTH WHEEL

BACKGROUND OF THE INVENTION

1. Field of the Invention

Tractor and trailer rigs employ an articulated connection between the tractor and trailer commonly referred to as a fifth wheel. The fifth wheel will usually be mounted on the tractor frame between the rear wheels. A kingpin on the trailer is guided between tongues on the fifth wheel and a pair of jaws automatically close and lock about the kingpin pivotally coupling the trailer to the tractor.

It is a common practice to disconnect the trailer for loading, thus freeing the tractor for other uses. Auxiliary trailer wheels on the undercarriage of the trailer are dropped down at such times to support the trailer. These wheels also elevate the trailer to permit the tractor to be backed underneath for coupling. They are manually extended and retracted by the truck operator when spotting or picking up the trailer. For short hauls within the loading yard or where the trailer is to be transported a short distance such as to a rail yard and trans-shipped by rail on a flatcar in so-called piggyback fashion, moving the trailer about becomes a time-consuming and laborious operation since the auxiliary trailer wheels must be cranked up and then down each time the trailer is moved and spotted in another location. This is especially troublesome in piggyback operations where many trailers are being shuttled from the loading yard to flatcars for shipment.

Thus, it is common in the trucking industry for fleet operators to employ a special tractor for such yard work. A yard tractor will often have a fifth wheel mounted on an elevating mechanism which can be raised or lowered for coupling with trailers spotted at various heights. The elevating fifth wheel also provides a capability particularly useful in piggyback operations of being able to move the trailer without having to retract the auxiliary trailer wheels each time the trailer is spotted at a new location.

In addition a yard tractor will often have a slidable rear window which will enable the operator to reach back from his position in the cab and connect or disconnect the air lines to the trailer. These features are to enable the operator to spot trailers in the shortest time and preferably without having to leave the cab of the tractor.

PRIOR ART

In one type of prior art elevating fifth wheel mechanism there is an elevatable fifth wheel which is lifted by a power operated mechanical linkage. The linkage has a pair of links pivotally connected at their upper ends at spaced points on the fifth wheel. One link, adjacent the tractor cab, is longitudinally movable while the other link, nearest the cab, is restrained from longitudinal movement. A hydraulic cylinder is connected to move the one link causing the stationary link to pivot, both links hinging up elevating the fifth wheel. However, the hinging movement is about a turning axis through the rear end of the stationary link causing the fifth wheel to move in an arc away from the tractor. Thus there is always some accompanying horizontal movement when raising or lowering the fifth wheel.

One disadvantage of this type of movement is a lack of safety should the hydraulic cylinder leak or lose pressure with the trailer in the elevated position. In this event, the fifth wheel will tend to swing downwardly and forwardly. If the kingpin of the trailer has not become securely locked in the jaws of the fifth wheel, there will be a tendency for the fifth wheel to be pulled out from under the trailer owing to the swinging movement of the fifth wheel. This may cause the trailer to drop out of control. Or, with the tractor and trailer brakes set, and the kingpin securely locked, there will be a tendency to break either the locking jaws of the fifth wheel or the kingpin when either raising or lowering the trailer because of the relative horizontal movement of the trailer.

Another difficulty with accompanying horizontal movement of the fifth wheel is that it displaces the kingpin of the trailer away from the normal pivotal axis. This shifts the load distribution on the tractor and trailer axles which may create unfavorable loading conditions for highway driving. In addition when the tractor-to-trailer clearance is altered in spotting the trailer, the front of the trailer may strike the tractor as the trailer is being lowered if the tractor is parked at an angle to the trailer.

The operator must also reach a greater distance in order to connect or disconnect the air lines to the trailer in the elevated position and it is a common occurrence that the operator must leave the cab and climb up on the tractor to attend to the air lines. Thus, there has long been a need for a fifth wheel assembly which could be elevated substantially without an accompanying horizontal movement.

Such prior art arrangements are also plagued with maintenance problems. When the fifth wheel is lowered, as is normally the case in over-the-highway use, the hydraulic cylinder rod is fully extended. Thus the cylinder rod is constantly exposed to road and weather conditions. Accumulations of dirt and oil on the road will eventually damage the seals and create cylinder leakage problems.

Also typically a single acting hydraulic cylinder is used to provide the power for raising the trailer. Often it is difficult to lower the fifth wheel because the hydraulic cylinder will not return under the weight of the fifth wheel alone due to internal friction of the linkages and even with the added load of the trailer, the mechanical advantage of the elevating mechanism will react against the load to diminish the return force acting on the hydraulic cylinder such that it returns slowly to the fully lowered position.

SUMMARY OF THE INVENTION

The present invention is uniquely suited to a resolution of these and other problems wherein there is provided a vertically elevatable fifth wheel mechanism (1) which is raised and lowered in a vertical manner substantially without accompanying horizontal movement making it especially suited for piggyback operations; (2) which has a greater inherent safety owing to the purely vertical elevating movement and is more reliable and maintenance free than the aforementioned hinge and link type elevating mechanisms; (3) which has the load carrying capacity for use in over-the-highway operations as well as yard work; and (4) which is more rapidly raised and lowered.

In accordance with the present invention, a tractor and trailer are pivotally coupled by a fifth wheel mounted on the tractor. The tractor has a frame supporting a rear axle assembly upon which are mounted rear road wheels. The fifth wheel is mounted between the rear road wheels on an elevating mechanism supported on the frame. The elevating mechanism includes first and second links pivotally connected together adjacent their inner ends on a common hinge axis extending transversely to the longitudinal axis of the tractor. One link is movable longitudinally relative to the other link such that both links hinge vertically at the common hinge axis in consequence of longitudinal movement of the one link. The fifth wheel is pivotally mounted on a separate transverse axis such that its pivotal axis undergoes a compound rotational-translational motion which has an essentially vertical straight-line overall movement in consequence of the combined movement of the two links.

A feature of the preferred arrangement is that when the opposite outer ends of the links are extended, the links have a low profile within the frame such that the pivotal axis of the fifth wheel is lowered substantially even with the top of the chassis frame. This provides a lower profile of the fifth wheel and makes it easier to couple with trailers spotted at low heights.

A single acting hydraulic cylinder is mounted horizontally between the tractor cab and elevating mechanism and is connected to effect longitudinal movement of the one link. The cylinder rod extends on a line through the opposite outer ends of the links so that as the links are initially raised a relatively high force is required. As the distance between the hinge axis of the two links and the line of action of the cylinder rod increases, however, the required lifting force decreases. The mechanical advantage is employed in reverse when lowering the fifth wheel to return the cylinder rod rapidly even without a trailer attached.

This arrangement of the cylinder where the cylinder rod acts in the direction of the hinge point of the two links in raising the fifth wheel also ensures that the rod is withdrawn into the cylinder when the fifth wheel is lowered, as is normally the position in over-the-highway use, so that the rod is protected from damage and road conditions during the majority of the time.

It is another feature of the invention that it can take the form of a mechanical sub-assembly designed to fit within a small mounting space of a conventional tractor. As is sometimes desirable, over-the-highway tractors are converted into yard tractors when, through extended service life, they are no longer economical for long haul distances. The fifth wheel mounting of such tractors, however, usually occupies a smaller space in the tractor frame than will accommodate a conventional prior art vertical elevating mechanism. For such a vehicle to be converted to yard use and still be utilized for over-the-highway operations is often a costly operation. As a consequence there has been a desire in the trucking industry for a reliable, compact and inexpensive fifth wheel assembly for converting tractors for low-cost yard work which will also have the load carrying capacity for over-the-highway service when needed.

The main advantage envisioned by the invention is the provision of a vertically elevatable fifth wheel which can be raised and lowered substantially without accompanying horizontal movement making it especially suited for piggyback operations.

Also the arrangement of an elevating mechanism where the fifth wheel is raised and lowered in substantially vertical straight-line movement provides for greater safety, better load distribution and safe clearance in all positions of the tractor and trailer in coupling and uncoupling operations.

A further advantage is that the invention provides a mechanical movement which can be raised and lowered more rapidly with negligible internal linkage friction and is inherently more reliable and free of maintenance problems than with known prior art hinge and link type elevating mechanisms.

Other novel advantages and features of the present invention will become apparent from a consideration of the following detailed description thereof made with reference to the accompanying drawings wherein:

DESCRIPTION OF THE DRAWINGS

FIG. 4 is a partial, perspective view showing the fifth wheel elevating mechanism in a collapsed position; and FIG. 5 is a view similar to FIG. 4 showing the mechanism in the raised position.

DESCRIPTION OF THE PREFERRED EMBODIMENT

Figure 1:
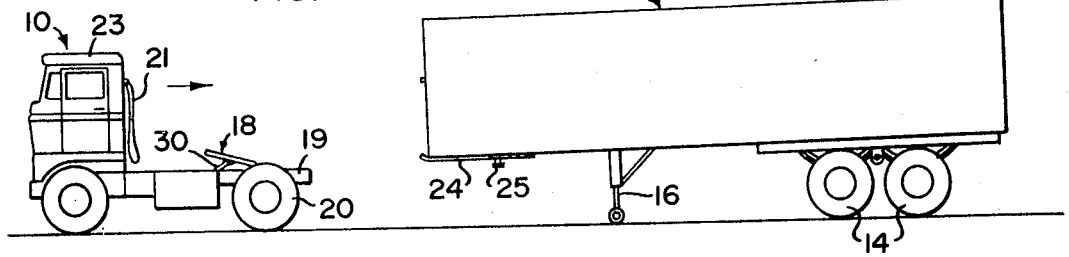
FIGS. 1–1C are sequence views depicting a piggyback operation where a tractor couples to a trailer, raises it, transports it to a rail siding and spots it on a flatcar all without retracting the auxiliary trailer wheels.
Figure 1A:
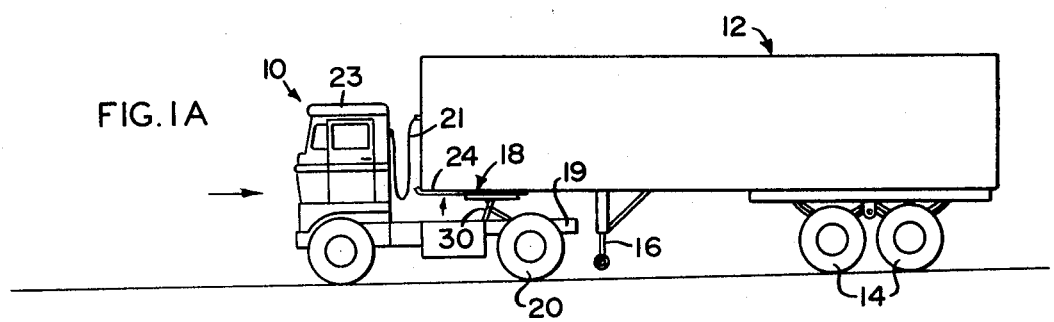
Figure 1B:
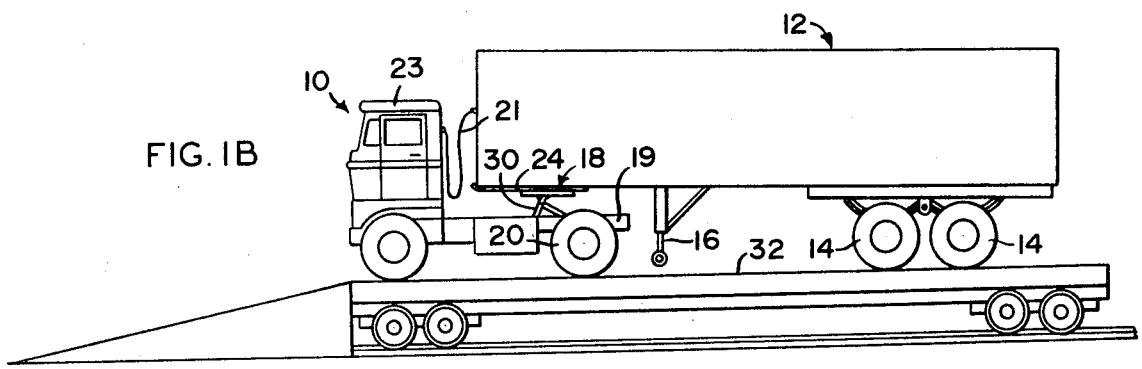
Figure 1C:
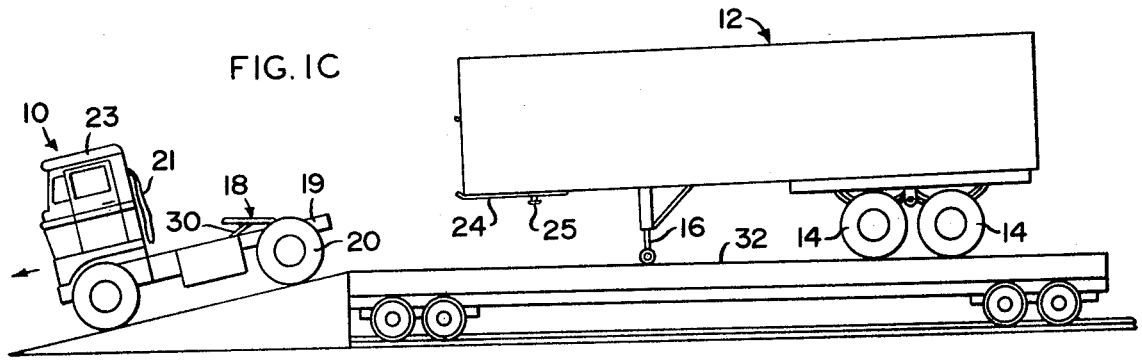

FIGS. 1–1C depict a typical series of operations where a trailer is to be loaded on a flatcar and transshipped by rail in so-called piggyback fashion. It is in such piggyback loading operations that tractors having an elevatable fifth wheel are particularly useful. In FIG. 1 a tractor 10 is shown backing toward a trailer 12 which it is assumed has been loaded in the yard and is standing free on its road wheels 14 and auxiliary trailer wheels 16. The tractor 10 has a fifth wheel 18 mounted on the tractor frame 19 slightly forward of the rear tractor road wheels 20. Air lines 21 which will be coupled to the trailer for operating the trailer brakes are shown on temporary hangers supported from the back of the tractor cab 23. The auxiliary trailer wheels 16 elevate the trailer sufficiently to allow the tractor to be backed underneath. A coupling plate 24 on the undercarriage of the trailer will be at a level to slide upon the fifth wheel 18 and in the process a kingpin 25 will be coupled at the pivotal axis of the trailer.

At this juncture it should be appreciated that the weight of the trailer is off of the auxiliary trailer wheels 16 and is now being taken by the tractor and trailer road wheels. If the tractor 10 were not equipped with an elevatable fifth wheel, it would be necessary to retract the trailer wheels 16 before moving the trailer. But as depicted in FIG. 1A, the fifth wheel 18 is mounted on an elevating mechanism 30, described more in detail hereinafter, which enables the operator to raise the trailer and transport it for at least short distances without having to retract the wheels 16.

Also, where cab 10 is provided with a slidable rear window, the operator can connect the air lines 21 to the trailer without leaving the cab. The trailer 12 can now be moved and spotted at a new location which, as illustrated in FIG. 1B, is upon the bed of a flatcar 32. Again, without having to leave the cab of the tractor, the operator can disconnect the air lines and lower the trailer to the bed of the flatcar. After uncoupling the fifth wheel, the tractor may be driven out from underneath the trailer which is left standing on the flatcar in so-called piggyback fashion.

The operation described is that which might be considered to benefit most in time and labor saved through the use of a tractor having a vertically elevatable fifth wheel, however, it will be appreciated that the invention is not limited to piggyback operations but is equally applicable to over-the-highway use.

Figure 2:
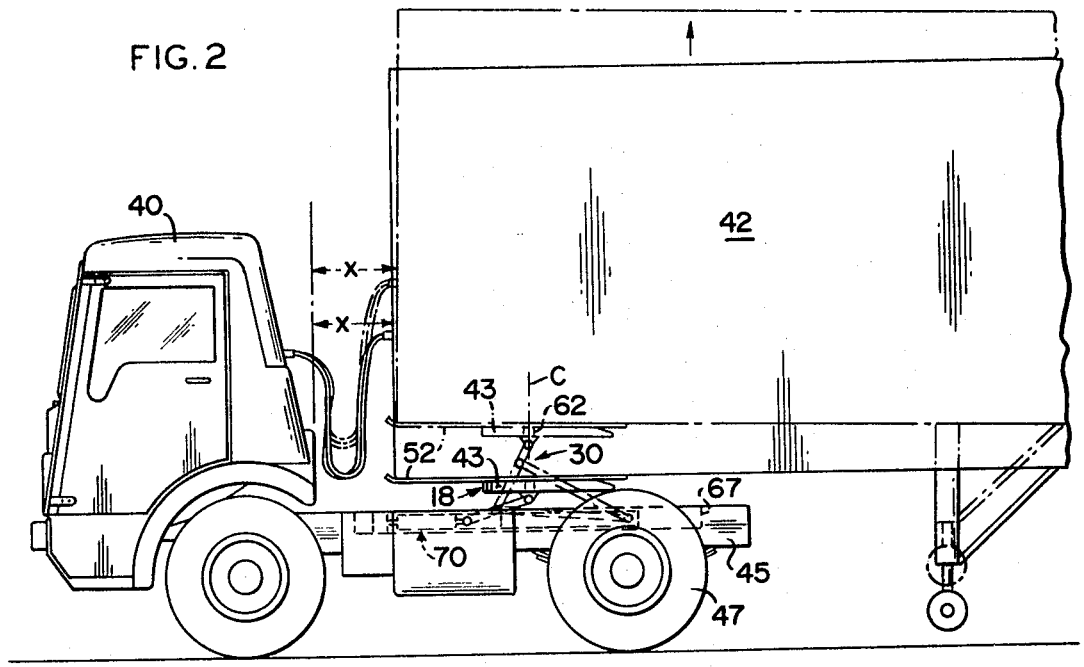
FIG. 2 is a partial side elevational view of a tractor and trailer combination shown with the trailer pivotally coupled to the tractor on a fifth wheel elevatable in accordance with the invention.

As illustrated in FIG. 2, a tractor 40 is shown pulling a trailer 42 which is pivotally coupled to the tractor by a fifth wheel 43. The fifth wheel is supported on the elevating mechanism 30 which is the same mechanism depicted in the schematic views FIGS. 1–1C and, in accordance with the preferred embodiment of the invention, is illustrated in more detail in FIGS. 3–5.

Figure 3:
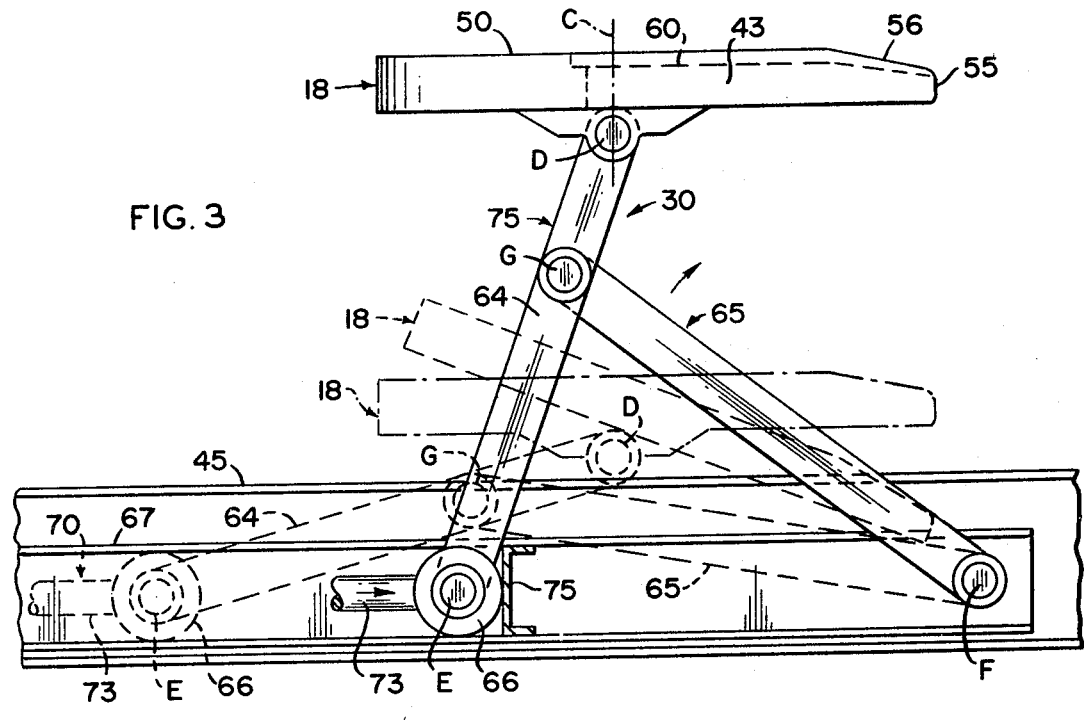
FIG. 3 is a fragmentary view of the tractor frame showing the elevating mechanism for raising and lowering the fifth wheel.

Referring to FIG. 3, the elevating mechanism 30 is positioned between side frame rails 45 of the tractor 40 slightly forward of the rear road wheels 47. The tractor shown has a single rear axle assembly but obviously the tractor may be of a dual rear axle type. The fifth wheel will normally be positioned sufficiently far forward to maintain a given tractor-trailer overall length within the applicable highway regulations as to length and yet provide sufficient clearance between the tractor and trailer to permit normal turning movement.

The fifth wheel 43 is usually an integral casting providing a generally circular load bearing surface 50 on which a coupling plate 52 of the trailer 42 is adapted to pivot. The fifth wheel 43 will have rearwardly projecting tongues 55 (FIGS. 4 and 5) which are beveled on the surfaces 56 and together define a tapered keyway 57 terminating in a slot 60 at the center of the fifth wheel. A kingpin 62 on the trailer is guided between the tongues 55 when coupling the tractor to the trailer such that the kingpin 62 enters the slot 60 where jaws (not shown) automatically lock and pivotally hold it. With the kingpin 62 secured as in FIG. 2, the tractor and trailer will pivot about the vertical axis C of the kingpin. It is customary practice to couple the kingpin so that the axis C is in a vertical plane through the transverse pivotal axis D of the fifth wheel, however, other factors such as load distribution, turning radius, and the like may force consideration of placing the kingpin either to the rear or forwardly of the transverse axis D.

The elevating mechanism 30 comprises a pair of links 64, 65. The link 64, nearest the tractor 40, is mounted on rollers 66 at the lower end which travel in longitudinally extending channels 67 mounted within the side rails 45 of the tractor frame. A hydraulic cylinder 70, adapted to be controlled from the cab of the tractor 40, is horizontally mounted at 71 to a cross beam 72 extending laterally between the side rails 45. The cylinder 70 is of the single acting type in that fluid pressure supplied to the cylinder will cause extension of a cylinder rod 73 which is returned by external force applied in the opposite direction, however, a double acting cylinder may be used where a positive hydraulic pressure is desired for returning the cylinder rod. The cylinder rod 73 is connected to link 64 on the transverse axis E of the rollers 66 midway between the rollers.

The link 65, nearest the trailer 42, is pivotally connected to the channels 67 at its outer end which is fixed relative to the frame 45 but pivots about the transverse axis F. The transverse axes E and F are longitudinally spaced in the same horizontal plane and the axis E is movable horizontally in a straight-line manner relative to the axis F which is fixed. The two links 64, 65 are pivotally connected together on a common hinge axis G.

The axis G is spaced relatively close to the plane of the axes E and F when the links 64, 65 are extended out. That is, with the opposite ends of links 64, 65 at their widest spacing, as shown by the dotted line position of FIG. 3, the hinge axis G and the plane of axes E and F are both within the side rails 45 of the tractor frame. As will be seen, this disposes the links 64, 65 to lie in a very low profile with the links substantially below the top of the side rails 45 in the lowered position.

The line of action of the cylinder rod 73 coincides with the plane of axes E and F, but it is also possible to have the rod act on a line above or below such plane or the cylinder may be allowed to pivot vertically out of its horizontal position about its pivotal mounting at 71 as the linkage is raised and lowered. Preferably, however, the cylinder will remain in a horizontal position and the line of action of the cylinder rod 73 will be closely spaced to the hinge axis G in the lowered position of the links. This means that a relatively high initial force will be needed to raise the trailer load, but as the links hinge up, the spacing increases between the axis G and the line of action of the cylinder rod. Thus the lifting force is decreasing as the links are raised. This mechanical movement operates in reverse when lowering the fifth wheel to return the cylinder rod more rapidly, a feature previously mentioned which is especially useful in cold climates where the prior art hinge and link mechanisms have acted to diminish the returning force sometimes preventing the fifth wheel from being fully lowered unless a trailer load is applied. This arrangement also provides that the cylinder rod 73 is not extended in the lowered position of the links 64, 65 which is the normal over-the-highway position. This assures that the cylinder rod is not exposed to road and weather conditions which would lead to added maintenance problems and possibly cause early failure of the cylinder.

In the extended position of the cylinder rod 73, the axis E of the rollers 66 is moved rearwardly as shown by the solid line position in FIGS. 3 and 5. The rollers 66 abut against a cross beam 75 in the fully raised position of the links 64, 65. It will be noted that as the transverse axis E of the rollers 66 moves toward the cross beam 75 and the links 64, 65 hinge up, the axis G travels in an arcuate path upwardly and rearwardly about the axis F at the opposite end of the link 65. It will be further noted that the fifth wheel 43 is pivotally mounted on the upper end of link 64 which extends beyond the hinge axis G. The link 64 pivotally supports the fifth wheel on axis D. Axis D lies in a plane through the roller axis E and the hinge axis G. This plane rotates about the roller axis E while the latter moves horizontally. Link 65 pivotally supports link 64 at hinge axis G. Axis G lies in a plane through the fixed axis F and rotates about that axis. The combined rotational-translational movement of the link 64 and the purely rotational movement of link 65 causes axis D to undergo a compound nearly straight-line vertical movement such that in the raised or lowered positions of the fifth wheel, the axis D lies in the same vertical plane. Stated otherwise, the pivotal axis D of the fifth wheel is moved vertically, substantially without accompanying horizontal movement, between the dotted and full line positions shown in FIG. 3. This arises from the geometry of the axis D, E, F and G and the limit of movement permitted axis E.

Considering the showing in FIG. 3, it will be appreciated that by moving the hinge axis G, the rotational-translational movement of link 64 will be changed. For example, by moving the axis G toward axis D there is a tendency to force the inner end of link 64 to move more arcuately about the axis F while moving the axis G toward the axis E tends to cause the link 64 to swing more about that axis. The essential point is that regardless of the particular geometry of the links, the rotational components of movement at axis D about either pivot axis E or F should be substantially equal and opposite so that the inner end of link 64 moves vertically substantially without accompanying horizontal movement.

Taking an example, assume that the length of link 64 from axis E to axis D is 3.34 feet and the length of link 65 similarly is 3.58 feet; that the horizontal distance between axes E and F in the lowered position is 5.74 feet and the horizontal movement permitted by the roller axis E is 2.12 feet; then the vertical displacement of the axis D is 2.25 feet. For this specific case the length of link 64 from axis E to axis G is 2.3 feet and the ratio of this length to the axis-to-axis length of link 64 is 0.69. Of course, these dimensions are for purposes of illustration only and it will be understood that others may be used to obtain substantially vertical movement of the inner end of link 64.

Of course, a trailer mounted on the fifth wheel is raised and lowered substantially without accompanying horizontal movement as is illustrated in FIG. 2 where the trailer 42 is raised and lowered such that a distance X between the front of the trailer and the back of the tractor cab remains essentially constant in either position.

There is thus greater inherent safety in the mechanical movement of the invention owing to the essentially vertical straight-line motion of the kingpin axis C. Should the cylinder 70 lose pressure for any reason while the trailer is raised there will be no accidental disconnection of the trailer allowing it to drop out of control as was the possibility with prior art elevating mechanisms having a horizontal component of movement. Also for piggyback operations, the operator can reach back in either the raised or lowered position of the trailer 42 and through the rear window of the cab, where such window is slidable, connect and disconnect air lines 78 to the trailer without having to leave the cab.

Modifications and changes may be made to the invention as will be apparent to those skilled in the art to which it pertains which modifications and changes are to be regarded as reasonable equivalents thereof and are intended to be covered by the appended claims except insofar as limited by the prior art.

What is claimed is:

1. A tractor-trailer fifth wheel mounting comprising
a link member extending longitudinally of the tractor having spaced opposite ends,
a fifth wheel pivotally supported on a transverse axis adjacent one of said ends,
means for moving the opposite end longitudinally toward said transverse axis, and
means for constraining a point on said link member to rotate arcuately about a separate transverse axis longitudinally spaced in the direction of movement of said opposite link end, the link member being rotated about the latter mentioned end while said end moves longitudinally and simultaneously said point on the link rotating in the opposite direction about said separate transverse axis, the rotational-translational components effectively cancelling each other considering the overall movement of the said link member whereby said fifth wheel is moved vertically essentially without accompanying horizontal movement.

2. A tractor-trailer fifth wheel mounting according to claim 1 wherein said opposite link end and separate transverse axis are in the same horizontal plane.

3. A tractor-trailer fifth wheel mounting according to claim 1 wherein the pivotal axes at the spaced, opposite ends of the link member lie in a plane containing said point on the link member which rotates about said separate transverse axis.

4. A tractor-trailer fifth wheel mounting according to claim 1 wherein the ratio of the length of the link member to the distance from the longitudinally movable end to said point is about 0.6 to 0.8.

5. A tractor-trailer fifth wheel mounting comprising
first and second links extending longitudinally of the tractor having oppositely spaced outer ends and adjacent inner ends,
a fifth wheel pivotally mounted on the inner end of one of the links,
the other link pivotally connected at its inner end to said one link intermediate its ends, and
the outer end of said one link movable relative to the opposite outer end of the other link which is stationary, whereby said fifth wheel is raised and lowered vertically substantially without accompanying horizontal movement.

6. A tractor-trailer fifth wheel mounting according to claim 5 wherein the opposite outer ends of said links are below the top of the tractor frame and in the widest spaced position of said ends, the inner end of said other link lies substantially at the top of said frame.

7. A tractor-trailer fifth wheel mounting according to claim 5 wherein means on the frame is operable to restrict longitudinal movement of said one outer end to about the distance that the fifth wheel is moved vertically.

8. A tractor-trailer fifth wheel mounting according to claim 5 wherein a hydraulic cylinder is connected to said one outer end to effect longitudinal movement thereof, said cylinder having an extensible rod acting toward the stationary link end in elevating the fifth wheel and being returned in the opposite direction when lowering the fifth wheel.

9. A tractor-trailer fifth wheel mounting comprising
first and second longitudinally extending links pivotally interconnected at a hinge axis intermediate the ends of one link,
a fifth wheel,
said one link pivotally mounting said fifth wheel at one end and being pivotal about a transverse axis at the opposite end which end is movable generally horizontally, said hinge axis and fifth wheel pivotal axis lying in a plane which rotates about said horizontally movable end, and
means constraining said hinge axis to move arcuately about a separate transverse axis, the rotational components being substantially equal but opposite at said fifth wheel pivotal axis whereby said axis undergoes a compound substantially vertical movement.

10. In a tractor-trailer combination having a pivotal coupling allowing the trailer to pivot relative to the tractor, the improvement comprising
elevating means supporting the pivotal coupling on the tractor for movement between lowered and raised positions of the trailer including
a rigid supporting link having first, second and third pivotal axes extending transversely to the longitudinal axis of the tractor, the first located at one end of the link and movable horizontally, the second spaced from the first at the opposite end of the link mounting said pivotal coupling, and the third located intermediate the first and second axes, and
means constraining the link to move arcuately at said third axis about a fourth transverse axis longitudinally spaced from said first axis and causing the link to rotate about the first axis with accompanying horizontal movement thereof whereby the trailer is raised and lowered substantially without accompanying horizontal movement.

11. The improvement according to claim 10 wherein said constraining means includes a second rigid supporting link pivotally connected on one end to the first link at the third axis and on the opposite end at said fourth axis.

12. The improvement according to claim 11 wherein said pivotal connection between the first and second links is at a distance from the first axis greater than one half the length of the first link.

13. The improvement according to claim 12 wherein the ratio of the distance from the first to the third axis to that between the first and the second axes is approximately 0.7.

14. The improvement according to claim 10 wherein a hydraulic cylinder is mounted between the tractor and elevating means having an extensible cylinder rod connected to said first axis substantially on the longitudinal axis of the tractor, said first and fourth axes lying in a common plane and the cylinder rod acting on a line through the first and fourth axes closely spaced to and below said third axis in the widest spaced position of the first and fourth axes whereby the cylinder rod is withdrawn in the lowered position of the trailer and is extended to effect horizontal movement of the first axis when raising the trailer.

* * * * *